United States Patent [19]
Vincent

[11] 3,799,221
[45] Mar. 26, 1974

[54] DUST COLLECTION SYSTEM

[75] Inventor: Clifford A. Vincent, Chio, Calif.

[73] Assignee: Consolidated Rock Products Co., Los Angeles, Calif.

[22] Filed: Oct. 4, 1972

[21] Appl. No.: 295,023

Related U.S. Application Data

[62] Division of Ser. No. 94,447, Dec. 2, 1970, abandoned.

[52] U.S. Cl. .................................. 141/93
[51] Int. Cl. ............................. B65b 1/28
[58] Field of Search ......... 141/290, 93, 59; 222/152

[56] References Cited
UNITED STATES PATENTS

| | | | |
|---|---|---|---|
| 2,843,161 | 7/1958 | Ward | 141/290 |
| 2,659,521 | 11/1953 | Howle et al. | 141/290 X |
| 2,733,848 | 2/1956 | Houwers | 141/290 |
| 2,401,124 | 5/1946 | Walker et al. | 141/290 X |

Primary Examiner—Stanley H. Tollberg
Attorney, Agent, or Firm—Christie, Parker & Hale

[57] ABSTRACT

There is provided a system for collecting dust during the filling of a mixer with cementitious materials. Basic to the system is a hopper having a conduit for transport of materials to the mixer, a seal which surrounds the outlet of the conduit and engages the inlet of the mixer and an exhaust duct having an inlet which faces the interior of the mixer and outlet for connection to a source of suction. Application of suction to the exhaust duct during filling of the mixer removes the dust generated during the filling of the mixer. The hopper may be used in conjunction with aggregate dispenser having a seal which contacts the periphery of the inlet of the hopper and an exhaust manifold which aids in exhausting dust and the air displaced during the filling operation.

11 Claims, 4 Drawing Figures

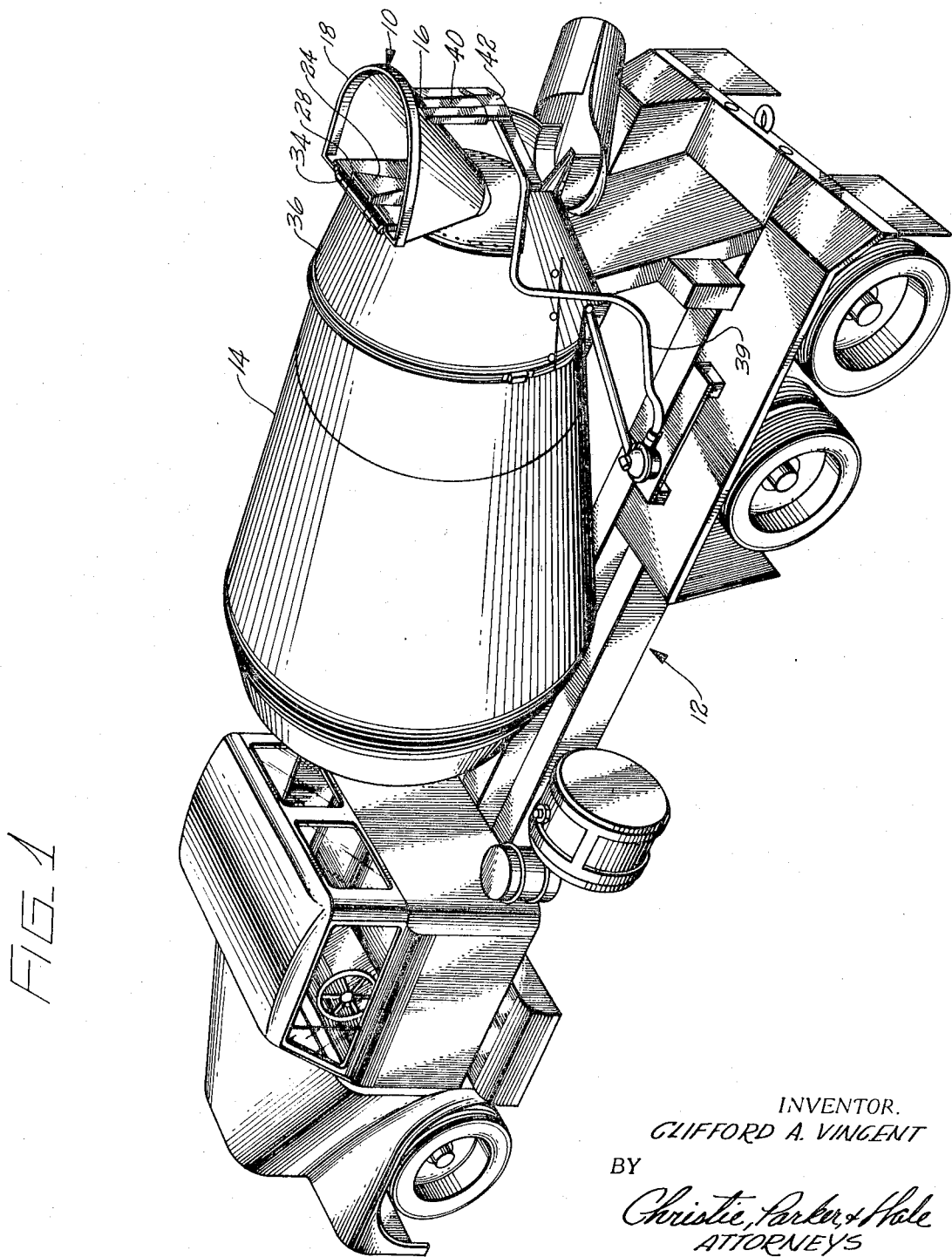

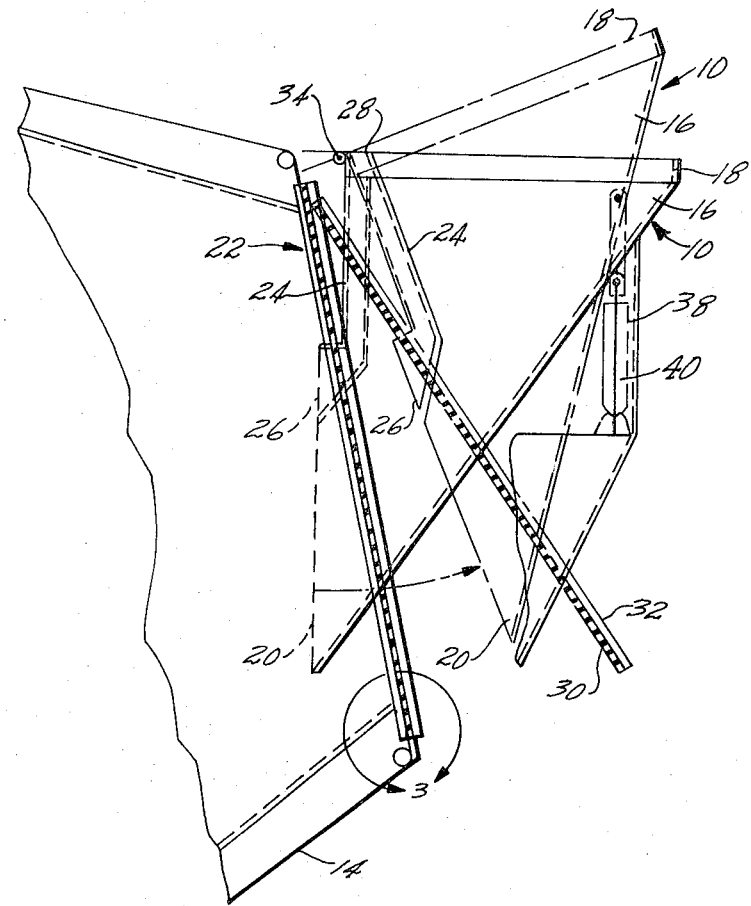
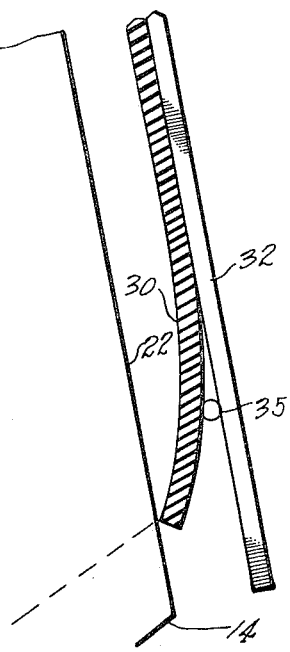

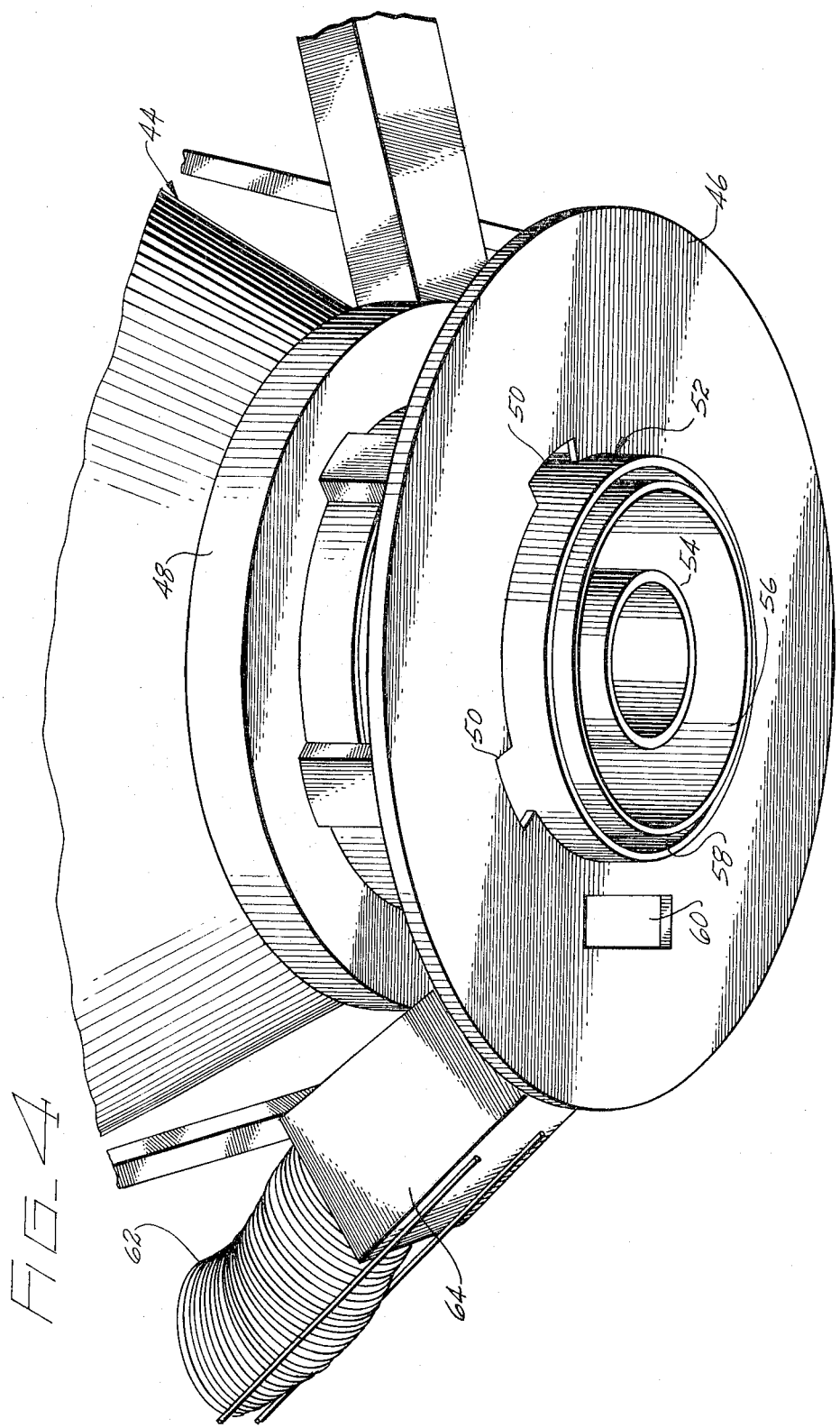

3,799,221

DUST COLLECTION SYSTEM

BACKGROUND OF THE INVENTION

This is a division of my U.S. Pat. application Ser. No. 94,447 filed Dec. 2, 1970 now abandoned.

The present invention relates to a dust collection system and more particularly to a dust collection system for use in the filling of mobile cement mixers.

A considerable amount of dust in the form of fine particulate matter is generated when the drum of the mobile concrete mixer is filled with its normal complement of cement, aggregate and water. With increasing national concern over pollution of the environment, many municipalities have enacted or are considering the adoption of regulations which require the collection of this dust.

In order to reduce dust emissions, it has been proposed to surround the discharge port of the filling system, the hopper and inlet port of the cement mixer with an exhaust shroud connected to a dust collection system. About 6,000–7,000 cubic feet per minute of air are moved through such shrouds during a filling operation. Because of the draft created as much as 4 lbs. of particulate matter is removed per truckload. This consistutes excessive waste, for without the shroud only about one-fourth lb. of dust is generated during the loading opeaation.

SUMMARY OF THE INVENTION

According to the present invention there is provided an improved dust collection system, particularly useful in the filling of mobile mixers such as concrete trucks with particulate matter.

This system comprises a hopper having a conduit adapted to engage with the discharge nozzle of a reservoir containing particulate matter and the inlet of a rotatable mixing drum; a seal adapted to contact the periphery of the inlet of the mixing drum; an exhaust duct having one end facing the inlet of a mixer drum, and an opposed outlet end adapted for connection to a source of suction; means to mount the hopper on the mixing drum and means to move at least a portion of the seal away from the inlet of the mixer.

In the preferred construction, the hopper is hinged to permit the hopper to pivot, along with the seal, away from the inlet of the mixing drum when its contents are to be discharged.

The hopper is preferably used in association with a discharging system having a discharge nozzle for dispensing particulate matter to the hopper; a sealing surface for contact with the periphery of the inlet of the conduit of the hopper surrounding the nozzle and an annular manifold surrounding the discharge nozzle, the manifold being provided with a plurality of ports which are adapted to be positioned within the periphery of the inlet of the conduit of the hopper and which aid in exhausting dust which may backwash into the hopper during filling operations as well as displaced air.

In using the dust collection system of this invention in the filling of concrete mixing trucks the exhaust requirements during a filling operation are reduced to about 200 cubic feet of air per minute and dust loss during thd delivery of a normal complement of cement, aggregate and water to the mixer is reduced to about 0.01 lb. with none of the dust being emitted to the atmosphere.

THE DRAWINGS

FIG. 1 is an illustration of a cement truck equipped with the loading hopper of this invention;

FIG. 2 is a detail view of the preferred loading hopper construction illustrating its operational relationship to the mixing drum of a cement truck;

FIG. 3 is an illustration of the sliding seal employed on the face of the flange of the loading hopper shown in FIG. 2 and which permits the mixing drum to rotate relative to and in contact with the hopper; and FIG. 4 is an illustration of a manifolded discharge system for mating, in sealing and exhaust relationship with the hopper of FIG. 1.

DESCRIPTION

According to the present invention there is provided a dust collection system which is of particular utility during the filling of rotatable mixing drums with particulate matter and which is particularly adapted for loading mobile concrete mixers with cement, aggregate and water.

The system comprises a hopper for receiving particulate cementitious materials and delivering these materials to a mixing drum, a means for sealing the discharge end of the hopper against the inlet end of the mixing drum and a duct facing the inlet of the mixing drum, the duct being adapted to be connected to means to exhaust dust generated during the filling of the mixer.

The hopper is adapted to connect with the discharge nozzle of the dispensing or gathering hopper for cementitious materials and in the preferred system, the discharge nozzle is also provided with a seal which contacts the periphery of the inlet of the hopper, a ported annular exhaust manifold which aids in removing additional dust as well as the air displaced during filling of the mixing drum.

With reference just to FIGS. 1 and 2, hopper 10 of this invention is shown connected to concrete truck 12, having a conventional mixing drum 14. The hopper consists of a conduit 16 which is adapted at the inlet end 18 to communicate with the discharge nozzle of a batch loading hopper for cementitious materials and to engage at the opposed end 20 with the inlet 22 of drum 14.

The hopper is also provided with exhaust duct 24. One end of the duct 26 communicates with and faces the interior of drum 14, and the opposed end 28 is adapted to couple to a suction means (not shown).

Hopper 10 is further provided with seal means 30 which contacts the periphery of inlet 22 of drum 14 at least during filling operations. Since the diameter of the discharge end 20 of conduit 16 is normally less than the diameter of the inlet 22 of drum 14, seal means 30 is preferably supported by flange 32 which causes the seal to abut against a periphery inlet 22 of drum 14. Seal 30 is also preferably a sliding seal which permits drum 14 to rotate relative to its surface.

To permit discharge of mixed concrete the hopper is provided with some means to move the seal away from the periphery of the inlet to drum 14. Flange 32 may, for instance, be hinged at the lower end to serve as a flap which pivots away from the drum without movement of the balance of the hopper.

Preferably and necessarily when the seal used does not permit rotation of the drum relative to its surface, hopper 10 is pivotally mounted to hinge 34 secured to frame 36 in order that the hopper may be rotated away from inlet 22 of drum 14. While the hopper may be pivoted by any means there is conveniently employed air piston 38 which is serviced by line 39 from the air brake mechanism of concrete truck 12.

With reference now to FIG. 3, there is illustrated a sliding seal which may be used when drum 14 is rotatable against seal 30 of hopper 10. The seal comprises an annular elastomeric seal 30 which is retained by flange 32 yet partially separated therefrom by "O"-ring 35 When hopper 10 is positioned against the inlet 22 of drum 14 the elastomeric seal 30 is pressed against and compresses the "O"-ring 35 by the periphery of the inlet to the drum to form a substantially air tight seal. Because the elastomeric seal 30 is canted with respect to "O"-ring 35 the area of contact of the elastomeric seal 30 with the inlet 22 of drum 14 is minimized, which in turn minimizes the friction generated during rotation of drum 14. To further minimize friction, hopper 10 is provided with leg 40 which rests against support bracket 42 which bears the weight of hopper 10 when air cylinder 36 is inactivated.

The hopper of this invention is preferably used in conjunction with the dispenser unit illustrated in FIG. 4. With reference thereto the dispenser unit comprises water jacketed gathering hopper 44, flexible seal 46, and annular exhaust manifold 48 having ports 50 which are adapted to be positioned within the inlet 18 of hopper 10. Gathering hopper 44 is provided with nozzle 52 having central tube 54 and two annular tubes 56 and 58. Central tube 54 delivers the aggregate, while tubes 56 and 58 deliver, respectively, the cement and water to the hopper of the concrete mixer with the outer annular ring of water aiding, in part, in diminishing dust generation. Seal 46 is, again, preferably elastomeric in nature, and is adapted to seal against the receiving end 18 of hopper 10. While the seal may be free it may also be supported by a rigid flange (not shown). It is, however, preferably unsupported in order that it may self-adjust to variations in contours of the hopper and variations and attitudes of the hopper with respect to the seal. The seal may also be provided with suction port 60 adapted to mate with the discharge end 28 of duct 24. This port is, in turn, preferably coupled to manifold 48, in order that both may be serviced by a common exhaust system.

As indicated, the inlet 26 of duct 24 faces the interior of drum 14. In this relation, the direction of flow of dust and air into the duct is countercurrent to the flow of charge into the drum. This minimizes th amount of dust withdrawn and prevents plugging of the duct. There may, however, occur also some dust backwash into the conduit 16 of hopper 10. This dust and some of this displaced air is collected by annular manifold 48. To permit this, the ports of the manifold 48 are positioned within the periphery of the inlet to hopper 10.

In operation, the driver positions cement truck 12 under the batch loading hopper 44. Batch loading hopper 44 is then dropped and positioned with its seal 46 covering the inlet 18 of the hopper and with its suction intake 60 to the dust collection system aligned with the outlet 28 of duct 24 of the hopper. The dust collector is set into operation and suction provided to the duct and the manifold by flexible tube 62 connected to junction 64 and the loading of the drum initiated. In the loading operation, approximately 7-½ cubic yards of concrete mix are dispensed to drum 14 over a period of approximately 1 minute. In order to remove the air displaced during the loading operation as well as the dust, the volume of air drawn by duct 24 and when used, manifold 46 must be at least approximately 200 cubic feet per minute. The air and the collected dust pass to a filter bag housed by a dust collecting system (not shown). When filling is complete, the batch loading hopper 44 is then lifted away from the truck, and the truck is driven away and the mixing operation is initiated with the inlet to the drum, either in sliding relation against seal 30 or hopper 10 is partially pivoted away from the drum 14 by the air cylinder 36 where the seal employed does not permit rotation of the drum.

While duct 24 is shown positioned within hopper 10, it may be secured to its exterior surface of conduit 16 or to flange 30 as long as it faces the interior of drum 14 when flange abuts the drum.

In addition, hopper 10 may be dimensioned to align with inlet 22 of drum 14 and be provided with an annular, conically shaped seal which mates with opening 22 of drum 14.

While any elastomeric material may be used as the seal surfaces 30 and 44, where the rotation of drum 14 against the seal is desired, there may be employed a carbon face seal, silicon rubber seals and the like which provides low friction surfaces against which the drum may rotate for long periods of time without excessive wear.

What is claimed is:

1. A dust collection system for use in removing dust during transfer of particulate matter to the inlet port of a rotatable mixer which comprises a transfer hopper for receiving and transferring dispensed particulate matter to the rotatable mixer and a dispenser having a discharge nozzle for dispensing particulate matter from an interconnected batch loading hopper to said transfer hopper, said transfer hopper comprising:
   a. a conduit providing open communication between the discharge nozzle of said dispenser and the inlet port of the mixer;
   b. seal means for contacting the periphery of the inlet port of said mixer surrounding the discharge end of said conduit;
   c. an exhaust duct having an inlet for facing an inlet of said mixer and an outlet for connection to suction means associated with said dispenser;
   d. means for mounting said transfer hopper on said rotatable mixer; and
   e. means for moving at least a portion of said seal means away from the periphery of the inlet port of said mixer;
   and said dispenser comprising:
   a. a discharge nozzle;
   b. second seal means for contacting the periphery of the inlet of said conduit in sealing relation;
   c. an annular manifold providing a plurality of ports adapted to be positioned within the periphery of the inlet of the conduit of said transfer hopper in facing relation to the inlet of the conduit; and
   d. means to connect said manifold to suction means.

2. A dust collection system as claimed in claim 1 in which the seal means of said transfer hopper is supported by a flange surrounding the discharge end of said conduit.

3. A dust collection system as claimed in claim 1 in which the periphery of the inlet of said mixer is rotatably positioned against the seal means of said transfer hopper.

4. A dust collection system as claimed in claim 2 in which the periphery of the inlet of said mixer is rotatably positioned against the seal means of said transfer hopper.

5. A dust collection system as claimed in claim 2 in which the means to mount said hopper on said mixer includes means to pivotally rotate the transfer hopper outwardly from the inlet to said mixer.

6. A dust collection system as claimed in claim 1 in which the dispenser contains means to couple suction means to the exhaust duct of said transfer hopper.

7. A dust collection system as claimed in claim 6 in which the means to couple the suction means to said exhaust duct is in open communication with said manifold.

8. A dust collection system as claimed in claim 1 in which the exhaust duct is secured to the interior of the conduit of said transfer hopper, the outlet of said exhaust duct extending approximately to the inlet of said conduit and said dispenser being provided with at least one additional exhaust port for connection to suction means, said exhaust port in connecting communication with an aperture in said second seal means, said aperture being positioned for alignment with the outlet of said exhaust duct.

9. A dust collection system as claimed in claim 1 in which the conduit and duct of said transfer hopper extends into the interior of said mixer when the seal means is in contact with the periphery of the inlet port of the mixer.

10. A dust collection system as claimed in claim 8 in which the conduit and duct of said transfer hopper extends into the interior of said mixer when the seal means is in contact with the periphery of the inlet port of the mixer.

11. A dust collection system claimed in claim 6 in which the manifold of said dispenser and the duct of said transfer hopper are connected to a common suction means.

* * * * *